US012783393B1

(12) United States Patent
Goren et al.

(10) Patent No.: US 12,783,393 B1
(45) Date of Patent: Nov. 3, 2026

(54) SYSTEM AND METHOD FOR IMPROVED DETECTION OF BEHAVIOR PATTERNS OF WEB UI COMPONENTS FOR ACCESSIBILITY TESTING

(71) Applicant: Evinced, Inc., Los Altos Hills, CA (US)

(72) Inventors: Daniel Goren, Kfar Bilu (IL); Shahar Fleishman, Hod Hasharon (IL); Yossi Synett, Hod Hasharon (IL); Gal Moav, Tel Aviv (IL); Navin R. Thadani, Los Altos Hills, CA (US); Illai Zeevi, Tel Aviv (IL); Yahlly Schein, Tel Aviv (IL); Itzik Basson, Hadera (IL); Saimon Lankri, Petah Tikva (IL); Raz Cohen, Petah Tikva (IL); Tova Bernstein, Beitar Illit (IL); Neil Osman, Tel Aviv (IL)

(73) Assignee: Evinced, Inc., Los Altos Hills, CA (US)

( * ) Notice: Subject to any disclaimer, the term of this patent is extended or adjusted under 35 U.S.C. 154(b) by 0 days.

(21) Appl. No.: 19/641,164

(22) Filed: Apr. 7, 2026

(51) Int. Cl.
*G06F 11/3668* (2025.01)

(52) U.S. Cl.
CPC ................................ *G06F 11/3688* (2013.01)

(58) Field of Classification Search
CPC .................................................. G06F 11/3688
USPC .............................. 717/121–140; 706/25–45
See application file for complete search history.

(56) References Cited

U.S. PATENT DOCUMENTS

| | | | | |
|---|---|---|---|---|
| 8,533,141 | B2 * | 9/2013 | Doig | G06Q 10/0633 706/45 |
| 10,234,953 | B1 * | 3/2019 | Li | G06F 3/1423 |
| 10,834,102 | B2 * | 11/2020 | Johns | G06N 20/00 |
| 11,099,237 | B2 * | 8/2021 | Nochilur | G01R 31/31835 |
| 11,734,162 | B2 * | 8/2023 | Myers | G06F 11/3684 717/124 |

(Continued)

OTHER PUBLICATIONS

Ibrahim et al, "Semantic Analysis System to Recognize Moving Objects by Using a Deep Learning Model", IEEE, pp. 1-14 (Year: 2024).*

(Continued)

*Primary Examiner* — Anil Khatri
(74) *Attorney, Agent, or Firm* — M&B IP Analysts, LLC

(57) ABSTRACT

The method and system for improved detection of accessibility issues in Web interfaces is presented. The method includes capturing a rendered screenshot of a web page into a browser-controlled environment and a structured representation of a document object model (DOM); computing, by executing a trained detection model, one or more visual patterns from the rendered screenshot, the trained detection model outputting visual detections that include bounding boxes and visual pattern labels; constructing a mapping between at least one bounding box and a corresponding DOM element; determining, for at least one DOM element, a semantic pattern using a DOM-based semantic classifier that reads accessibility-related metadata; detecting a component root for a UI component corresponding to the at least one DOM element; and executing, by a component testing system, an accessibility test suite corresponding to an identified pattern for the UI component, and recording accessibility issues associated with the UI component.

17 Claims, 4 Drawing Sheets

(56) References Cited

U.S. PATENT DOCUMENTS

| | | | | |
|---|---|---|---|---|
| 12,430,103 | B1 * | 9/2025 | Domeniconi | G06F 8/30 |
| 12,627,697 | B2 * | 5/2026 | Kim | H04L 63/1433 |
| 12,632,491 | B1 * | 5/2026 | Yu | G06F 16/383 |

OTHER PUBLICATIONS

Paydar et al, "A Semantic Web Based Approach for Design Pattern Detection from Source Code", ACM, pp. 1-6 (Year: 2012).*
Sun et al, "Semi-supervised Semantic Pattern Discovery with Guidance from Unsupervised Pattern Clusters", ACM, pp. 1-9 (Year: 2010).*

* cited by examiner

SYSTEM AND METHOD FOR IMPROVED DETECTION OF BEHAVIOR PATTERNS OF WEB UI COMPONENTS FOR ACCESSIBILITY TESTING

TECHNICAL FIELD

The present disclosure generally relates to automated analysis of graphical user interface and, in particular, to systems and methods for detecting and classifying behavioral patterns of web-based user interface components.

BACKGROUND

Modern web interfaces increasingly rely on complex, component-based UI frameworks that generate deeply nested DOM structures, dynamic overlays, and visually intricate components. Although these components may appear uniform and intuitive to sighted users, the accessibility semantics embedded within the DOM often diverge significantly from their visual presentation. Developers may use non-semantic HTML elements for stylistic convenience, fail to update ARIA attributes when refactoring components, or incorporate third-party component libraries whose internal structures obscure the true interactive element intended for user interaction. As a result, visually similar patterns often behave differently, and structurally similar DOM patterns may represent entirely different user experiences.

Traditional automated accessibility testing tools operate either by parsing the DOM statically or by applying simple heuristics on semantic roles and attributes. These tools assume that the developer has correctly marked the accessibility semantics within the DOM and therefore cannot identify cases in which the visual appearance of a component meaningfully contradicts its declared semantics. For example, a visually styled button implemented as a link, or a hamburger icon that opens a modal instead of a menu, will often be misclassified by existing systems because they rely solely on DOM semantics or pattern-specific rules. In practice, this leads to false negatives when invalid patterns go undetected, and false positives when legitimate components are flagged incorrectly due to minor or inconsistent markup.

Further, traditional solutions lack mechanisms for resolving ambiguity when the visual and semantic cues disagree or when the DOM fails to reveal the intended behavior of a component. Many UI patterns can only be understood through active interaction: a combo box may be indistinguishable from a text input until the system attempts to type into it, and a button may behave as a menu trigger, a modal launcher, or a navigation control depending on how the application responds when it is activated. Existing tools do not perform controlled interactions or analyze resulting DOM mutations, leaving them incapable of determining the true component type in such cases. This prevents accurate pattern recognition and makes rigorous accessibility testing of complex components impossible.

Moreover, traditional systems do not reliably identify the element that screen readers and keyboard users actually interact with because nested component libraries often wrap interactive elements in multiple layers of structural or stylistic containers. Without accurate identification, accessibility tests may be executed on the wrong node, failing to detect real issues or generating misleading results.

Due to these limitations, conventional accessibility testing systems cannot provide robust, accurate, or scalable pattern classification for modern web interfaces.

It would therefore be advantageous to provide a solution that addresses the above challenges.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include capturing a rendered screenshot of a web page into a browser-controlled environment and a structured representation of a document object model (DOM); computing, by executing a trained detection model, one or more visual patterns from the rendered screenshot, the trained detection model outputting visual detections that include bounding boxes and visual pattern labels; constructing a mapping between at least one bounding box of the visual detections and a corresponding DOM element represented in the structured representation of the DOM; determining, for at least one DOM element, a semantic pattern using a DOM-based semantic classifier that reads accessibility-related metadata; detecting a component root for an UI component corresponding to the at least one DOM element, including using a contingency-table mechanism, an interactive-probing mechanism, or both; and executing, by a component testing system, an accessibility test suite corresponding to an identified pattern for the UI component, and recording one or more accessibility issues associated with the UI component. Other embodiments of this aspect include corresponding computer systems, apparatus, and computer programs recorded on one or more computer storage devices, each configured to perform the actions of the methods.

Implementations may include one or more of the following features. The method where the structured representation of the DOM is enriched with augmented attributes including at least one of computed accessibility metadata, element bounding rectangles, accessibility roles, event listeners, accessible names, or visibility state, and where the rendered screenshot and the enriched structured representation form a multimodal input set used to compute the visual patterns and determine the semantic pattern.

The method where constructing the mapping further may include: associating a bounding box with a DOM node by evaluating geometric overlap between the bounding box and a DOM-reported bounding rectangle of the DOM node.

The method where constructing the mapping further may include: responsive to multiple DOM elements overlapping a same bounding box or wrapper structures being present, applying a component-matching algorithm that utilizes one or more geometric or historical association metrics to select a matched DOM node; and assigning a unique selector to the matched DOM node.

The method where using the contingency-table mechanism further may include: detecting a conflict between a visual pattern and a semantic pattern using the contingency-table mechanism; and executing a machine-implemented resolution logic associated with the contingency-table mechanism that evaluates the visual-pattern and the semantic-pattern of the UI element to determine an appropriate resolution action for the UI element.

The method where using the interactive-probing mechanism further may include: determining whether a behavioral pattern of the UI component is certain; responsive to determining that the behavioral pattern is not certain;, simulating targeted interactions configured to expose an actual behavioral pattern, including at least one of keyboard-based inputs, pointer-based inputs, or both; and monitoring runtime evidence including at least one of DOM mutations, attribute transitions, triggered events, or focus shifts to match a behavioral signature to an established pattern definition.

The method where performing the interactive-probing mechanism further may include: applying one or more protective controls configured to reduce destructive effects during the interactive-probing mechanism; generating an accessibility report that consolidates the accessibility issues identified for tested elements, associates the accessibility issues with selectors and component roots, and includes metadata including severity and Web Content Accessibility Guidelines (WCAG) criterion applicability.

The method where generating the accessibility report further may include: correlating elements across scans using an accessibility-fingerprinting method based on semantic hierarchies and accessible-name paths. Implementations of the described techniques may include hardware, a method or process, or a computer tangible medium.

In one general aspect, the non-transitory computer-readable medium may include one or more instructions that, when executed by one or more processing circuitries of a device, cause the device to: capture a rendered screenshot of a web page into a browser-controlled environment and a structured representation of a document object model (DOM); compute, by executing a trained detection model, one or more visual patterns from the rendered screenshot, the trained detection model outputting visual detections that include bounding boxes and visual pattern labels; construct a mapping between at least one bounding box of the visual detections and a corresponding DOM element represented in the structured representation of the DOM; determine, for at least one DOM element, a semantic pattern using a DOM-based semantic classifier that reads accessibility-related metadata; detect a component root for an UI component corresponding to the at least one DOM element, including using a contingency-table mechanism, an interactive-probing mechanism, or both; execute, by a component testing system, an accessibility test suite corresponding to an identified pattern for the UI component, and recording one or more accessibility issues associated with the UI component. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: capture a rendered screenshot of a web page into a browser-controlled environment and a structured representation of a document object model (DOM); compute, by executing a trained detection model, one or more visual patterns from the rendered screenshot, the trained detection model outputting visual detections that include bounding boxes and visual pattern labels; construct a mapping between at least one bounding box of the visual detections and a corresponding DOM element represented in the structured representation of the DOM; determine, for at least one DOM element, a semantic pattern using a DOM-based semantic classifier that reads accessibility-related metadata; detect a component root for an UI component corresponding to the at least one DOM element, including using a contingency-table mechanism, an interactive-probing mechanism, or both; execute, by a component testing system, an accessibility test suite corresponding to an identified pattern for the UI component, and recording one or more accessibility issues associated with the UI component. Other embodiments of this aspect include corresponding computer systems, apparatus, and computer programs recorded on one or more computer storage devices, each configured to perform the actions of the methods.

Implementations may include one or more of the following features. The system where the structured representation of the DOM is enriched with augmented attributes including at least one of computed accessibility metadata, element bounding rectangles, accessibility roles, event listeners, accessible names, or visibility state, and the rendered screenshot and the enriched structured representation form a multimodal input set used to compute the visual patterns and determine the semantic pattern.

The system where the memory contains further instructions that, when executed by the processing circuitry for constructing the mapping, further configure the system to: associate a bounding box with a DOM node by evaluating geometric overlap between the bounding box and a DOM-reported bounding rectangle of the DOM node.

The system where the memory contains further instructions that, when executed by the processing circuitry for constructing the mapping, further configure the system to: responsive to multiple DOM elements overlap a same bounding box or wrapper structures being present, applying a component-matching algorithm that utilizes one or more geometric or historical association metrics to select a matched DOM node; and assign an unique selector to the matched DOM node.

The system where the memory contains further instructions which when executed by the processing circuitry for using the contingency-table mechanism further configure the system to: detect a conflict between a visual pattern and a semantic pattern using a contingency-table mechanism; and execute a machine-implemented resolution logic associated with the contingency-table mechanism that evaluates the visual-pattern and the semantic-pattern of the UI element to determine an appropriate resolution action for the UI element.

The system where the memory contains further instructions which when executed by the processing circuitry for using the interactive-probing mechanism further configure the system to: determine whether a behavioral pattern of the UI component is certain; responsive to determining that the behavioral pattern is not certain; simulate targeted interactions configured to expose an actual behavioral pattern, including at least one of keyboard-based inputs or pointer-based inputs, or both; and monitor runtime evidence including at least one of DOM mutations, attribute transitions, triggered events, or focus shifts to match a behavioral signature to an established pattern definition.

The system where the memory contains further instructions which when executed by the processing circuitry for performing the interactive-probing mechanism further configure the system to: apply one or more protective controls configured to reduce destructive effects during the interactive-probing mechanism.

The system where the memory contains further instructions which when executed by the processing circuitry further configure the system to: generate an accessibility report that consolidates the accessibility issues identified for tested elements, associates the accessibility issues with selectors and component roots, and includes metadata including severity and Web Content Accessibility Guidelines (WCAG) criterion applicability.

The system where the memory contains further instructions that, when executed by the processing circuitry for generating the accessibility report, further configure the system to: correlate elements across scans using an accessibility-fingerprinting method based on semantic hierarchies and accessible-name paths. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
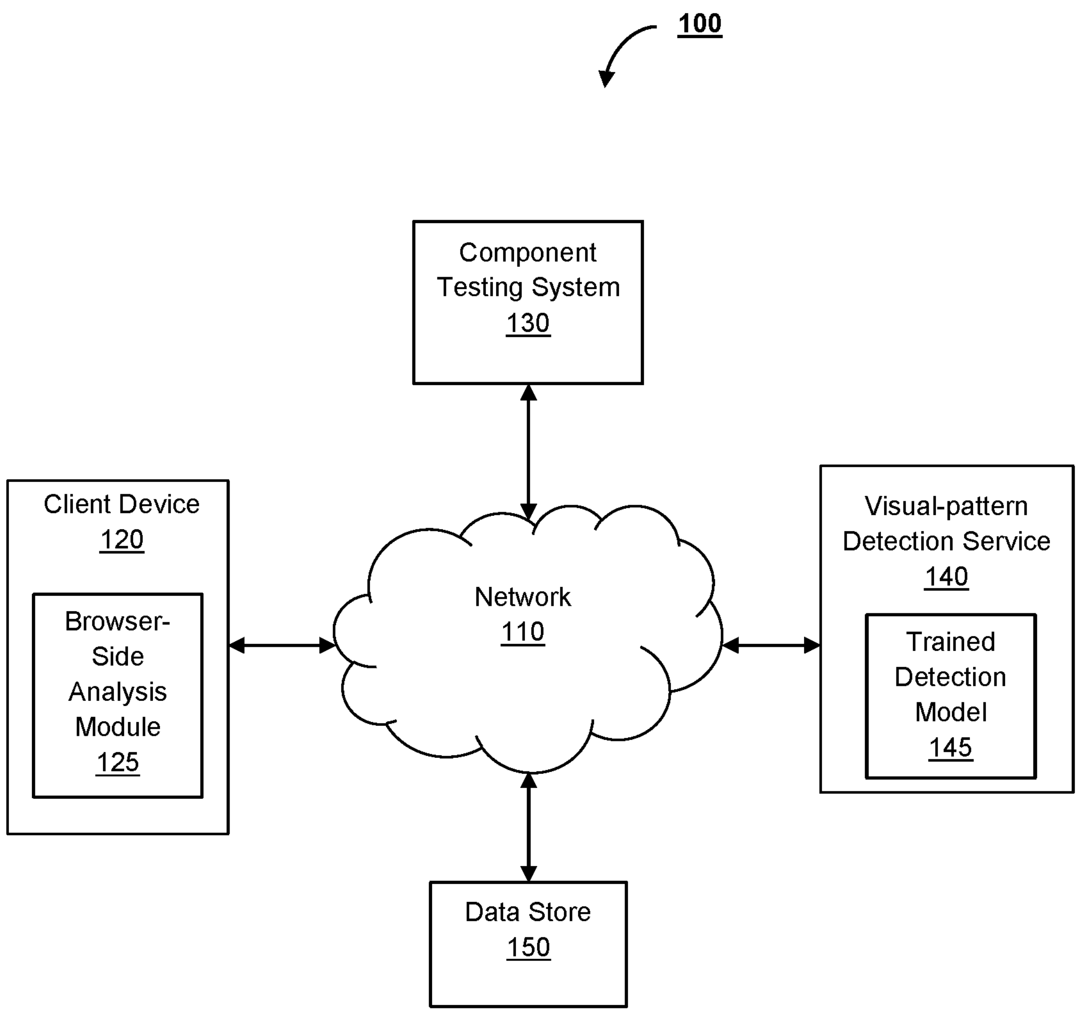
FIG. 1 shows an example network diagram utilized to describe the various disclosed embodiments.

It is important to note that the embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide significant advantages over conventional accessibility testing systems by jointly leveraging visual perception, DOM-based semantics, and controlled interactive probing to determine the true UI pattern type of web-interface components. By combining a computer-vision model trained on page screenshots with a DOM-semantic classifier derived from accessibility metadata, the system is able to recognize patterns even when developers mis-mark semantics or style elements inconsistently. A contingency-table mechanism, built from large-scale empirical data, allows the system to distinguish confident pattern cases, accessibility violations, and unresolved ambiguities. For unresolved cases, simulated interactions are used to observe real behavior and resolve uncertainty, enabling accurate pattern classification where static analysis alone fails. As a result, the invention substantially reduces false positives and false negatives, supports reliable and repeatable automated accessibility testing, and enables accessibility analysis of complex component-library based user interfaces at scale.

FIG. 1 shows an example network diagram 100 utilized to describe the various disclosed embodiments. One or more client devices 120, a component testing system 130, a visual-pattern detection service 140, a trained detection model 145, and a data store 150 are operatively coupled to exchange data, either through a network 110, through local inter-process communication, or through a combination thereof.

The network 110, when present, may include one or more public or private networks, such as the Internet, corporate intranets, wireless networks, or any combination thereof. In some embodiments, two or more of the client devices 120, the component testing system 130, the visual-pattern detection service 140, and the data store 150 may execute on the same physical computing device without requiring network communication.

In some embodiments, the client devices 120 may be developer workstations, build servers, automated test agents, browser extensions, or other computing devices capable of loading a web page to be analyzed. A browser-side analysis module 125 executing in association with a browser environment is configured to receive a live web page and capture a rendered screenshot along with a structured representation of the DOM. The browser-side analysis module 125 is further configured to compute an enriched DOM representation including accessibility metadata. The screenshot and enriched DOM representation are provided as inputs to the visual-pattern detection service 140, which applies the trained detection model 145 to identify visual UI elements and corresponding visual pattern labels.

In some embodiments, browser-side analysis module 125 may be implemented as a JavaScript-based analysis bundle that is injected into, embedded within, or otherwise executed in association with a web page loaded in a browser environment of the client device 120. The browser-side analysis module 125 is configured to operate within the execution context of the web page and has access to the live DOM, rendering state, and browser-provided APIs.

In some embodiments, the browser-side analysis module 125 is configured to compute an enriched DOM representation using an accessibility-analysis sub-module, such as an accessibility core engine. The enriched DOM representation includes structural information derived from the DOM tree together with accessibility metadata, including but not limited to accessibility roles, states, properties, accessible names, focusability indicators, event listeners, visibility state, and geometric bounding information. The browser-side analysis module 125 is configured to traverse the entire DOM to derive semantic and structural features for all elements present on the page, independent of whether those elements are visually detected by downstream models.

The browser-side analysis module 125 is further configured to capture a screenshot of the rendered web page directly from the browser environment. The screenshot represents the visual appearance of the page as presented to a sighted user at the time of analysis and may be captured using browser-native APIs, offscreen rendering techniques, or equivalent mechanisms. The screenshot capture may occur before, after, or concurrently with DOM enrichment, and may be repeated in response to state changes or interaction-driven mutations.

In some embodiments, the visual-pattern detection service 140 is configured to receive image data and textual data representing a rendered user interface and to apply trained detection model 145 to identify visual UI elements. In some embodiments, as mentioned above, image data, textual data, and the like is captured by browser-side analysis module 125 and transmitted to the visual-pattern detection service 140 through an application programming interface (API). The visual-pattern detection service 140 is configured to perform visual inference. In some embodiments, visual-pattern detection service 140 (via bounding-box-to-DOM-matching module 210, FIG. 2) is configured to match the visual detections to DOM elements in the enriched DOM representation. The visual-pattern detection service 140 is not required to load or render the web page itself, and in various embodiments does not have access to the DOM or to persistent system storage beyond model artifacts required for inference.

As used herein, the term "web page" refers to a rendered document represented internally as a DOM tree in a browser process. The web page may be rendered locally or accessible over a network. The term "DOM" refers to the Document Object Model, a structured representation of elements, attributes, and hierarchical relationships present in the web page. The term "accessibility metadata" refers to ARIA attributes, accessibility roles, state and property values, focusability, derived accessible names, a combination thereof, and the like that are exposed to assistive technologies through an accessibility tree.

As used herein, the term "accessibility technology" or "assistive technology" refers to any software or hardware mechanism that enables users with disabilities to access and interact with digital content, including but not limited to screen readers, magnifiers, voice-control systems, switch devices, alternative input systems, and operating-system accessibility services that expose an accessibility tree derived from the DOM. The term "graphical user interface (GUI)" refers to the visual presentation of interactive elements rendered within a web browser or other display surface, including but not limited to buttons, icons, menus, dialogs, forms, tabs, panels, lists, and other visible components. The term "UI component" refers to any interactive element or composite structure within a GUI that provides a specific user-facing function. An "interactive UI component" refers to a component that can be directly activated or manipulated by a user, such as a button, link, text field, checkbox, radio button, slider, or spin button. A "composite UI component" refers to a component consisting of a logical grouping of multiple interactive elements, such as a combo box containing an editable text field and a list of options, a menu containing menu items, a tab list containing tabs and a tab panel, or a disclosure control paired with content panels. The term "component behavior" refers to the expected interaction model, state transitions, and accessibility-exposed semantics that define how an interactive or composite UI component is intended to function. The term "rendered state" refers to the actual visual and structural configuration of the webpage at the moment it is captured by the system, including dynamic content, script-generated elements, overlays, conditional panels, or other transient interface states. The term "accessibility tree" refers to a structured representation produced by browsers and operating systems that convey the semantic roles, names, states, and hierarchical relations of elements to assistive technologies, distinct from the DOM tree but derived from it.

The term "visual pattern label" refers to a label such as "button", "menu", "checkbox", "tab", or similar, produced by the trained detection model 145 in response to the screenshot and associated with a bounding box on the rendered page. The term "semantic pattern label" refers to a label describing the intended accessibility semantics of a component as inferred from the DOM and accessibility metadata. The term "component root" refers to the DOM element that is treated as the primary interactive target of a UI pattern, for example, the element that receives focus or is announced by a screen reader. As used herein, the term "interactive-probing mechanism" refers to a machine-implemented mechanism that simulates one or more user interactions directed to a component root and monitors resulting runtime effects to determine a behavioral pattern of a candidate UI element. As used herein, the term "runtime evidence", "evidence", "mutation" or the like refers to observed effects resulting from simulated interaction, including, without limitation, DOM mutations, DOM subtree creation or reveal, changes in accessibility metadata, focus transitions, browsing-context change requests, value changes, controlled-content exposure, triggered events or other detectable interaction-induced effects. The term "tight ancestor" refers to an ancestor element whose bounding box tightly encloses a set of descendants associated with the same perceived component, and which is used to determine the component root. The term "pattern type" or "definitive behavioral pattern" refers to the final classification of a component after combining visual and semantic signals and, where needed, the results of the interactive-probing mechanism. The term "accessibility test", "accessibility test suite", or "pattern-specific accessibility test suite" refers to a sequence of automated interactions and validations performed against a component to determine whether it conforms to accessibility guidelines. The term "accessibility issue" refers to a detected deviation of the observed behavior or metadata of a component from an expected requirement for accessibility compliance (e.g., whether a component is machine-operable and machine-readable).

Additionally, the term "enriched DOM representation" refers to a DOM structure augmented with derived metadata, including element visibility, geometric bounding rectangles, pointer-interaction indicators, accessible names, ARIA attributes, accessibility roles, and focusability status. The term "selector" refers to a uniquely generated or synthesized CSS-style reference that unambiguously identifies a specific DOM element for the purposes of testing and reporting. The term "pattern signal" refers to either the visual pattern label produced by the trained detection model 145 or the semantic pattern label produced by the DOM-semantic classifier, each representing an independent hypothesis regarding the UI component type. The term "contingency table" refers to a predetermined matrix or mapping that correlates combinations of pattern signals with system actions such as declaring a final pattern, flagging an accessibility violation, performing the interactive-probing mechanism, or disregarding non-actionable combinations. The term "tight-ancestor cluster", "cluster" or the like refers to a set of DOM elements that visually or structurally function as parts of a single UI component and are used collectively during tight-ancestor analysis.

The trained detection model 145 of the visual-pattern detection service 140 refers broadly to any machine-learning or deep-learning system configured to process multimodal inputs, including, but not limited to image data and textual data, and to produce one or more outputs describing visual structures or objects present in image data. In some embodiments, the trained detection model 145 may be implemented as an object-detection neural network trained on UI screenshots, such as a convolutional neural network (CNN), a transformer-based vision model, a hybrid vision-language model, a region-based detection architecture, a multi-modal model, and the like. The trained detection model 145 is configured to accept an image of a rendered page and to output predicted bounding boxes, classification labels identifying visually recognizable UI components (for example, buttons, menus, checkboxes, sliders, tab lists, navigation bars, dialog triggers, combo boxes, or other interface elements), and optional confidence values. The model may be trained using supervised learning, semi-supervised learning, or reinforcement learning techniques, and training data may include annotated screenshots, synthetic renderings, augmented images, or multimodal representations incorporating both images and structural layout metadata. The trained detection model 145 is configured to provide a visual pattern-detection signal that reflects how a sighted user would perceive the interface, independent of the underlying DOM semantics.

In some embodiments, a semantic classifier (e.g., DOM-semantic classifier 220, FIG. 2) is configured to analyze the enriched DOM representation to determine, for DOM elements, semantic pattern labels that reflect how assistive technologies are expected to interpret corresponding UI components. The semantic classifier is configured to evaluate accessibility roles, ARIA attributes, state and property values, focusability indicators, accessible names, event-listener indicators, hierarchical grouping, list membership, and relationship attributes (e.g., aria-controls, aria-expanded, aria-haspopup, aria-owns, labeling associations, and the like), and to apply a semantic pattern algorithm that assigns a semantic pattern label to each candidate element. In some embodiments, the semantic pattern algorithm includes one or more deterministic classification rules and/or a trained classifier that maps such accessibility metadata and structural features to semantic pattern hypotheses (e.g., button, link, checkbox, menu, dialog trigger, combo box, tab, listbox, and the like). The semantic pattern labels produced by the semantic classifier are provided, together with the visual pattern labels produced by the trained detection model 145, as independent pattern signals to a pattern-association engine (e.g., pattern-association engine 240, FIG. 2) for reconciliation and final pattern determination.

In some embodiments, data store 150 is configured to be utilized in offline workflows, including model training, contingency-table construction, statistical analysis, and backward compatibility management. During runtime analysis of an individual webpage, the component testing system 130 may operate without accessing the data store 150, using transient in-memory data structures to hold enriched DOM representations, contingency-table logic, and detected accessibility issues. In such embodiments, the trained model artifacts deployed for inference are stored locally within the visual-pattern detection service 140, while historical artifacts and prior versions are retained in the data store 150 for development and tuning purposes.

In certain embodiments, the data store 150 also stores the contingency table used by the pattern-association engine, including the mapping between pairs of visual pattern labels and semantic pattern labels and the associated system actions. In some embodiments, the data store 150 holds the output of pattern-mining pipelines, including annotated samples collected from large sets of web pages, which may be used for refining the contingency table or training future semantic pattern algorithms.

The data store 150 may be realized as one or more persistent storage systems, including distributed cloud storage, object storage systems such as Amazon S3 or Google Cloud Storage, relational or non-relational databases, or local storage volumes. The data store 150 may support indexed access to DOM snapshots, selectors, component root identifiers, accessibility violations, and runtime evidence as a result of the interactive-probing mechanism. The data store 150 may also store a fingerprinting registry used to correlate elements across DOM mutations. The data store 150 thereby provides a durable, queryable repository supporting both runtime operation of the system and offline training, tuning, and analysis workflows.

In some embodiments, component testing system 130 is configured to reconcile visual pattern detections and semantic pattern detections using component roots as alignment keys. This reconciliation may include cases in which only one detection signal is present for a given component. A pattern-association engine (pattern-association engine 240, FIG. 2) within the component testing system 130 applies a contingency-table mechanism to determine whether a final pattern classification can be selected, whether an inherent accessibility violation is indicated, or whether additional uncertainty resolution is to be applied.

In some embodiments, other alignment mechanisms may additionally or alternatively be employed to associate a visually perceived component with a corresponding semantically inferred component. For example, in some embodiments the component testing system 130 is configured to align detections based on geometric correspondence between a visual bounding box and one or more element bounding rectangles derived from the enriched DOM representation, including overlap scores, containment relationships, and tight-ancestor cluster membership. In some embodiments, alignment is performed using selectors or other stable element identifiers generated for DOM nodes, such that a semantic pattern label assigned to a given selector is matched to a visual detection mapped to the same selector. In some embodiments, alignment is performed by traversing, and computing proximity within, an accessibility tree derived from the DOM, such as by identifying a closest ancestor or closest interactive relative that is exposed to assistive technologies and best corresponds to the visually detected region.

When ambiguity remains, the component testing system 130 is further configured (via interactive probing module 250, FIG. 2) to perform targeted user-interaction simulations to observe resulting runtime evidence and thereby resolve the component's actual behavior. Based on observed behavior, the component testing system 130 is configured to determine a final pattern classification and execute a pattern-specific accessibility test suite (pattern-specific testing suite 260, FIG. 2) corresponding to the final behavioral pattern. The component testing system 130 is configured to generate an accessibility report and emits fingerprint-relevant metadata for downstream aggregation by a separate platform service. Test results and detected accessibility issues are then provided to a report-generation subsystem (accessibility report generator 270, FIG. 2).

In some embodiments, the component testing system 130 interfaces with, and may be injected into, the browser-side analysis module 125 executing within a browser on a client device 120. In this embodiment, the component testing system 130 executes locally within the browser environment and performs semantic analysis, component root resolution, contingency-table evaluation, uncertainty handling, and pattern-specific accessibility testing directly against the live DOM of the web page. The component testing system 130 may operate as part of, or in coordination with, the browser-side analysis module 125, sharing access to the enriched DOM representation, accessibility metadata, and runtime interaction capabilities provided by the browser environment. In some embodiments, component testing system 130 executing via the browser-side analysis module 125 is configured to transmit selected data to the visual-pattern detection service 140 over a network (e.g., network 110, FIG. 1). It should be noted that operations configured to be executed by component testing system 130 at runtime do not require access to the data store 150.

The component testing system 130 can be realized in software, hardware, firmware, or a combination thereof. The software comprises one or more computer-readable storage media storing instructions that, when executed by one or more processors, cause the system to perform one or more functions as described herein. The software may be implemented in various programming languages and may operate on different computing environments, including but not limited to cloud-based systems, distributed networks, standalone computing devices, or embedded systems. The software may include algorithms, machine learning models, or rule-based processing to achieve the described functionality. Various implementations may employ modular, service-oriented, or microservices architectures, and the system may interface with databases, APIs, or external services.

Although FIG. 1 shows example elements of the network diagram 100, in some implementations, the network diagram 100 may include additional elements, fewer elements, different elements, or differently arranged elements than those depicted in FIG. 1.

Figure 2:
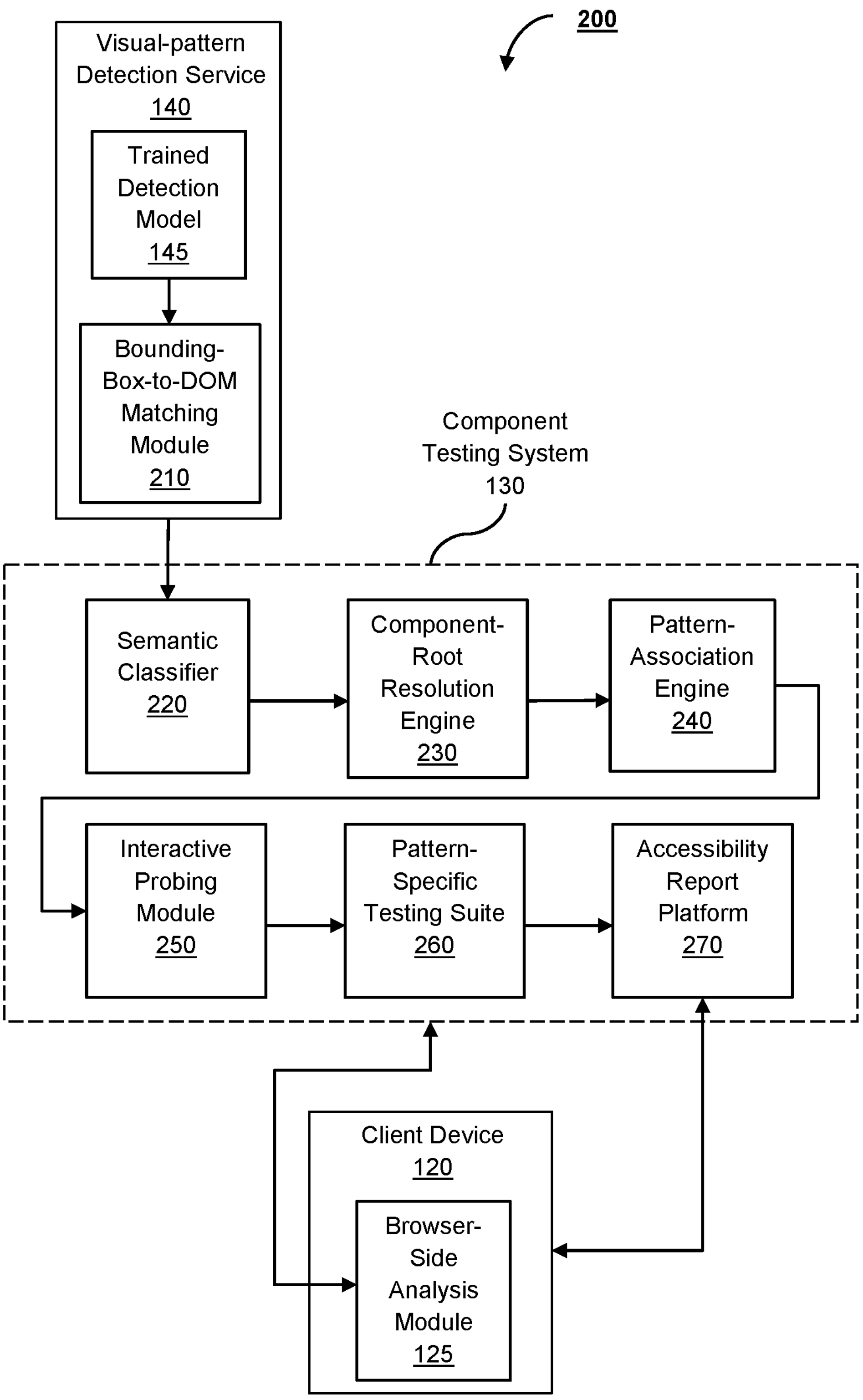
FIG. 2 is a functional block diagram of an example accessibility analysis system according to an embodiment.

FIG. 2 is a functional block diagram of an example accessibility analysis system 200 according to an embodiment. FIG. 2 illustrates a visual-pattern detection service 140 (which includes trained detection model 145 and bounding-box-to-DOM-matching module 210), and component testing system 130 (which includes DOM-semantic classifier 220, component root resolution engine 230, pattern-association engine 240, interactive probing module 250, pattern-specific testing suite 260, and accessibility report generator 270).

A browser-side analysis module 125 executing in association with a browser environment is configured to receive a live web page and capture a rendered screenshot along with a structured representation of the DOM. The browser-side analysis module 125 is further configured to compute an enriched DOM representation including accessibility metadata. The screenshot and enriched DOM representation are provided as inputs to the visual-pattern detection service 140, which applies the trained detection model 145 to identify visual UI elements and corresponding visual pattern labels.

The visual-pattern detection service 140 is configured to feed the screenshots to the trained detection model 145 and to receive from the trained detection model 145 a set of bounding boxes and corresponding visual pattern labels.

In some embodiments, a bounding-box-to-DOM matching module 210 of the visual-pattern detection service 140 is configured to associate each bounding box with at least one DOM element in the enriched DOM representation. In some embodiments, the bounding-box to DOM matching module 210 is further configured to apply heuristics that consider geometric overlap, containment relationships, pointer-interaction hints, visibility rules, and historical association data to identify, for each bounding box, a DOM element and a unique selector that best represent the visually detected component.

A DOM-semantic classifier 220 is configured to determine semantic pattern labels for DOM elements using the enriched DOM representation. The DOM-semantic classifier 220 is configured to evaluate accessibility roles, ARIA attributes, state and property values, hierarchical grouping, list membership, and other structural features, and to apply a semantic pattern algorithm that assigns a semantic pattern label to each candidate element. The visual pattern labels produced by the trained detection model 145 and the semantic pattern labels produced by the DOM-semantic classifier 220 are provided to a pattern-association engine 240.

A component root resolution engine 230 is configured to determine, for each element whose pattern is to be tested, a component root within the DOM hierarchy. The component root resolution engine 230 is configured to group elements into tight-ancestor clusters based on similarity of bounding boxes, containment, and semantic hints, to traverse ancestor relationships to identify the highest ancestor whose bounding region still corresponds to the visually unified component, and to select the component root as the element within this cluster that best reflects the interactive target used by assistive technologies.

In some embodiments, the pattern-association engine 240 is configured to evaluate one or more pattern labels associated with the candidate UI element to determine whether the candidate UI element can be classified without performing the interactive-probing mechanism. In some embodiments, the one or more pattern labels include, but is not limited to, a visual-pattern label, a semantic-pattern label derived from accessibility metadata, an auxiliary pattern label produced by a language model operating on DOM-associated text and structural context, and the like. In some embodiments, the pattern-association engine 240 is configured to use a contingency table, rule set, classifier, scoring process, or the like to determine, for each element, whether a definitive behavioral pattern of the candidate UI element can be identified without performing the interactive-probing mechanism, whether an accessibility issue can be reported without performing the interactive-probing mechanism, or whether performing the interactive-probing mechanism can resolve the definitive behavioral pattern.

In some embodiments, an interactive-probing module 250 is configured to perform controlled interactions on elements whose pattern remains uncertain after the pattern-association engine 240 consults the contingency table. The interactive-probing module 250 is configured to simulate user inputs such as keyboard events, mouse clicks, and focus changes on the candidate component root and to observe resulting runtime evidence including, but not limited to, DOM mutations, focus transitions, accessibility metadata changes, triggered events, and navigation attempts. The interactive-probing module 250 is further configured to apply pattern-specific decision logic to map observed behaviors, such as opening a modal, expanding a disclosure section, updating numeric values, or navigating to a new URL, to a final pattern type and to generate updated pattern determinations for those elements. The interactive-probing module 250 is configured to mitigate unauthorized side effects of the simulated interaction by cancelling or reversing navigation and closing transient overlays when necessary.

Pattern-specific testing suite 260 is configured to execute one or more accessibility validations that correspond to a definitive behavioral pattern classification for a component root. Upon receiving a finalized pattern classification, the pattern-specific testing suite 260 is configured to select and execute a set of accessibility tests tailored to expected interaction behaviors, semantic exposure, state behavior, focus behavior, keyboard operability, navigation behavior, controlled-content behavior, or other accessibility-relevant requirements associated with the definitive behavioral pattern. The tests may evaluate, among other aspects, whether the component exposes an appropriate accessibility role and accessible name, whether the component is reachable and operable via keyboard navigation, whether focus is correctly managed during interaction, whether state changes such as expansion, selection, activation, or dismissal are properly conveyed through accessibility metadata, and the like. During execution, the pattern-specific testing suite 260 is configured to monitor runtime evidence such as, but not limited to, DOM mutations, focus state, accessibility tree exposure, accessibility metadata, triggered events, and the like to detect deviations from expected behavior of the component.

Accessibility report interface 270 is configured to aggregate detection data, pattern determinations, and accessibility test results into an accessibility report dashboard viewable on the client device 120. The accessibility report interface 270 is configured to aggregate results of the accessibility validations (e.g., from the data store 150) and organize the results by UI component, component root, and final pattern type, and present detected accessibility issues together with contextual information that enables interpretation and remediation. The aggregated data may include, among other information, the visual and semantic pattern determinations, identifiers for the affected components, descriptions of violated accessibility requirements, and metadata indicating severity or relevance to accessibility guidelines. In some embodiments, the accessibility report interface 270 is configured to present the accessibility report as an interactive dashboard that allows users to navigate between components, filter or sort issues, and inspect detailed test outcomes for individual patterns.

In some embodiments, an element-fingerprinting module (not shown) is further configured to apply an element-fingerprinting mechanism based on semantic hierarchies and accessible-name paths so that repeated scans, even under DOM evolution, can be correlated to the same logical issues for presentation in the accessibility report interface 270. In some embodiments, the component testing system 130 interfaces with, and may be injected into, the browser-side analysis module 125 executing within a browser on a client device 120. In this embodiment, the component testing system 130 executes locally within the browser environment and performs semantic analysis, component root resolution, contingency-table evaluation, uncertainty handling, and pattern-specific accessibility testing directly against the live DOM of the web page. The component testing system 130 may operate as part of, or in coordination with, the browser-side analysis module 125, sharing access to the enriched DOM representation, accessibility metadata, and runtime interaction capabilities provided by the browser environment. In some embodiments, component testing system 130 executing via the browser-side analysis module 125 is configured to transmit selected data to the visual-pattern detection service 140 over a network (e.g., network 110, FIG. 1).

In some embodiments, the modules and engines described in FIG. 2 are implemented as software components executing on one or more processors of the visual-pattern detection service 140 and component testing system 130 and communicate over network 110 or through local inter-process communication. The arrangement of modules shown in FIG. 2 is illustrative, and the functions of individual modules may be combined or subdivided while still performing the method described herein.

Figure 3:
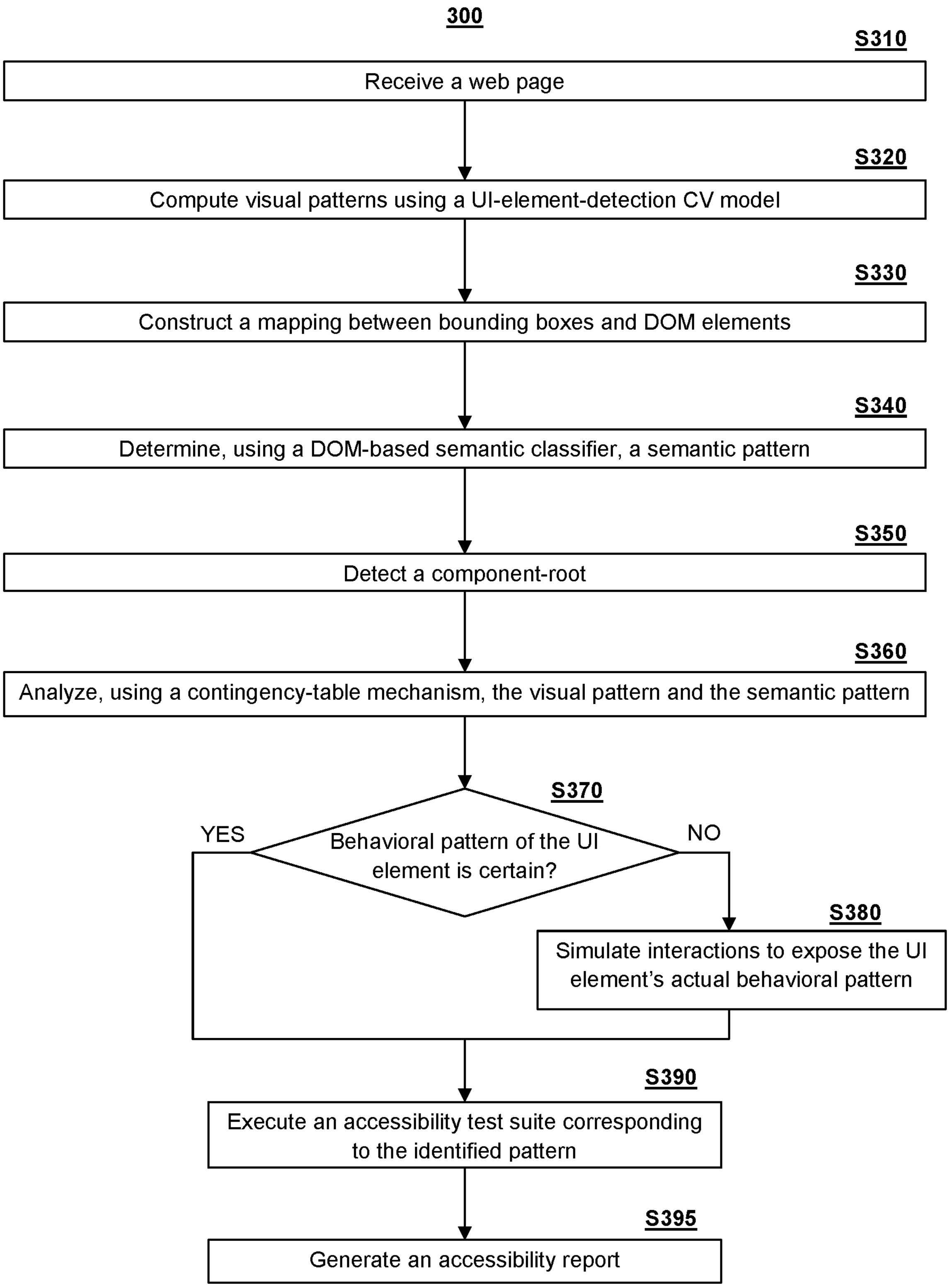
FIG. 3 is a flowchart of an example process for improved detection of behavioral patterns of web UI components according to an embodiment.

FIG. 3 is a flowchart of an example process 300 for improved detection of behavioral patterns of web UI components according to an embodiment.

At S310, a web page is received. In some embodiments, the web page is received by a processing engine that is operative to load the web document into a browser-controlled environment and capture both rendered screenshots of the web page and a structured representation of the DOM. The DOM representation may be enriched with augmented attributes including computed accessibility metadata, element bounding rectangles, accessibility roles, event listeners, accessible names, and visibility state. The screenshots and enriched DOM representation together form the multimodal input set utilized by the system.

At S320, visual patterns are computed using a trained detection model. In some embodiments, the trained detection model (e.g., trained detection model 145) is trained on web page screenshots, and the trained detection model is configured to output bounding boxes, confidence values, and predicted visual pattern labels such as "button", "menu button", "checkbox", "tab", or other identifiable UI patterns. In some embodiments, this trained detection model is trained using large, annotated corpora of UI screenshots and is optimized to detect visually recognizable interface components regardless of their underlying DOM semantics. The trained detection model is configured to produce visual detections that represent what a sighted user is expected to perceive.

At S330, a mapping between each bounding box and its corresponding DOM element is constructed. In some embodiments, the bounding boxes are associated with DOM nodes by evaluating geometric overlap between the detected bounding boxes and the DOM-reported bounding rectangles of each element.

In some embodiments, a heuristic procedure is applied for cases where multiple DOM elements overlap the same bounding box, where an element contains nested structural wrappers introduced by component frameworks, or where the visually clickable region is not located at the node carrying semantic attributes. The heuristic considers proportional coverage, containment relationships, pointer-interaction hints, visibility rules, historical element-selection logic, a combination thereof, and the like. In some embodiments, a unique selector is assigned to each matched DOM node so that subsequent stages may address the element consistently.

In some embodiments, steps S320 and S330 are performed by a single trained visual-pattern detection model that is configured to assign visual pattern labels directly to DOM elements using visual cues alone, such as a rendered screenshot of a web page and produces pattern labels that are already associated with specific DOM elements.

At S340, a semantic pattern is determined using a DOM-based semantic classifier. This semantic classifier is configured to read accessibility-related metadata including ARIA roles, ARIA states, ARIA relationships, hierarchical grouping, list structures, indicators of composite patterns, a combination thereof, and the like. The semantic classifier is further configured to interpret derived accessibility attributes generated in the enriched DOM representation, such as whether an element is keyboard-focusable, clickable, or has a semantic label or accessible name. In some embodiments, a method, to be discussed in more detail herein, determines the semantic pattern value for each DOM element. This semantic classification produces a second, independent pattern prediction signal that reflects how assistive technologies interpret the element.

In some embodiments, steps S320 through S340 are performed by a single multi-modal pattern detection model configured to analyze both visual cues from the rendered web page and structural and semantic information derived from the DOM. In this embodiment, the single multi-modal detection model is configured to receive as input a screenshot of the rendered interface together with DOM features such as element hierarchy, attributes, accessibility metadata, and layout information, and produces semantic pattern labels directly associated with DOM elements.

In a further embodiment, steps S320 and S340 are merged into a single visual-and-DOM pattern detection stage, and step S330 is an optional step that follows the merged steps of S320 and S340. In this embodiment, a detection model is configured to analyze both the rendered visual appearance of the web page and DOM-derived features to produce semantic pattern labels. The detection model of the merged steps S320 and S340 is configured to output pattern predictions that incorporate both visual and DOM context.

At S350, a component root is detected. In some embodiments, for each element whose pattern is to be tested, a tight-ancestor algorithm is executed to determine the component root of the UI component that is the proper target for accessibility testing. In some embodiments, the bounding box associated with the visual detection is evaluated against DOM ancestry, and elements whose bounding boxes fall within a defined similarity threshold are grouped into a tight-ancestor cluster. The DOM hierarchy is traversed upward until an ancestor is found that satisfies a predefined condition. The predefined condition may be met, for example, when the ancestor's bounding region ceases to reflect the visually unified component's footprint, when the ancestor's subtree contains unrelated content, a combination thereof, and the like. In some embodiments, the component root is selected as the highest ancestor within this tight-ancestor cluster that also satisfies semantic criteria such as carrying a structural role, being focusable, or being the element that screen-reader users would directly interact with. This ensures that accessibility testing is conducted on the true semantic target of the component, rather than on a wrapper or decorative container.

At S360, available pattern information for the candidate UI element is evaluated to determine whether the behavioral pattern of the candidate UI element is sufficiently certain for direct accessibility testing or whether additional uncertainty resolution is to be performed. In some embodiments, the available pattern information includes a visual-pattern label, semantic-pattern label derived from accessibility metadata, and the like. In some embodiments, the evaluation is performed using a contingency-table mechanism.

In some embodiments, after the component root has been identified, uncertainty resolution is performed for patterns whose contingency-table designation may require further investigation. Simulated user interactions are executed on the component root or its associated sub-elements to induce observable runtime evidence that clarify the behavior of the element. For example, various types of elements may be probed by applying keyboard-based inputs, pointer-based inputs, a combination thereof, and the like. Runtime evidence including, but not limited to, mutations to focus order, DOM structure, ARIA attributes, visible content, browser navigation state, and the like are monitored to determine the element's functional identity. In some embodiments, the interactive-probing mechanism includes countermeasures to preserve the test context, including mechanisms for canceling navigation attempts, closing dialogs that appear during probing, and restoring focus state after destructive actions. The result of the interactive resolution step is the final pattern determination for the component.

At S370, it is determined whether the behavioral pattern of the web UI element is certain. If YES, execution returns with S390. If NO, execution proceeds with S380.

In some embodiments, statistical techniques may be applied to entries in the contingency table that allow the actual behavioral pattern to be determined with certainty, without using further simulated interaction with the web UI component.

At S380, when the behavioral pattern is not certain, targeted interactions are simulated to expose the UI element's actual behavioral pattern. These interactions may include keyboard-based inputs; pointer-based inputs; focus movement, controlled input-editing actions, or other simulated interactions to elicit runtime evidence associated with the candidate UI element.

At S390, an accessibility test suite corresponding to the identified pattern is executed. The accessibility test suite is configured to evaluate accessibility requirements applicable to the identified behavioral pattern, and violations of expected behaviors are recorded as accessibility issues associated with the target component.

At S395, an accessibility report is generated. The report consolidates all accessibility issues identified for each tested element, associates them with the appropriate selectors and component roots, and incorporates metadata such as severity and WCAG criterion applicability. In some embodiments, a consolidation mechanism may further correlate elements across multiple scans or testing environments using an accessibility-fingerprinting method, ensuring that issues remain identifiable even if the page structure changes. In some embodiments, generating the accessibility report includes reporting at least one of a missing-semantics condition, a wrong-semantics condition, or a keyboard-inoperability condition identified during pattern evaluation, interactive probing, or pattern-specific accessibility validation.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
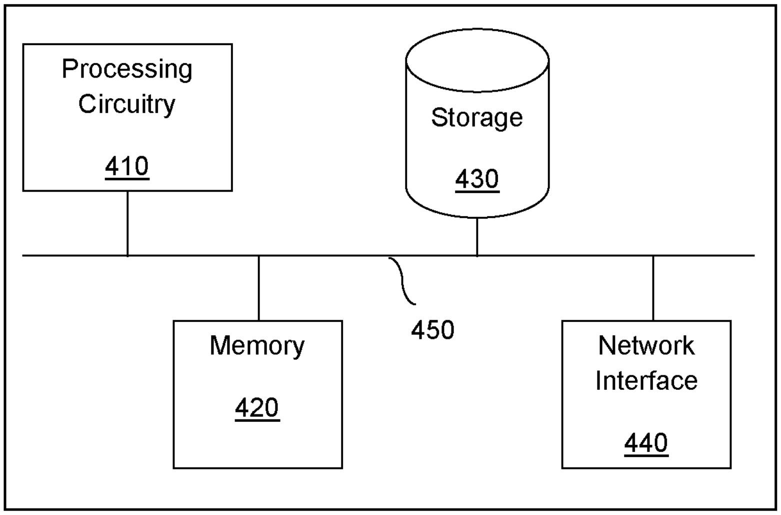
FIG. 4 is an example schematic diagram of a component testing system according to an embodiment.

FIG. 4 is an example schematic diagram 400 of a component testing system according to an embodiment. The component testing system (e.g., component testing system 130, FIG. 1) includes, according to an embodiment, a processing circuitry 410 coupled to a memory 420, a storage 430, and a network interface 440. In an embodiment, the components of the component testing system 130 are communicatively connected via a bus 450.

In certain embodiments, the processing circuitry 410 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 420 is a volatile memory (e.g., random access memory, etc.), a non-volatile memory (e.g., read only memory, flash memory, etc.), a combination thereof, and the like. In some embodiments, the memory 420 is an on-chip memory, an off-chip memory, a combination thereof, and the like. In certain embodiments, the memory 420 is a scratch-pad memory for the processing circuitry 410.

In one configuration, software for implementing one or more embodiments disclosed herein is stored in the storage 430, in the memory 420, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 410, cause the processing circuitry 410 to perform the various processes described herein, in accordance with an embodiment.

In some embodiments, the storage 430 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 440 is configured to provide the component testing system 130 with communication with, for example, the network 110, according to an embodiment.

It should be understood that the embodiments described herein are not limited to the specific architecture illustrated in FIG. 4, and other architectures may be equally used without departing from the scope of the disclosed embodiments.

Furthermore, in certain embodiments the visual-pattern detection service 140 may be implemented with the architecture illustrated in FIG. 4. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for improved detection of accessibility issues in Web interfaces comprising:

capturing a rendered screenshot of a web page into a browser-controlled environment and a structured representation of a document object model (DOM);

computing, by executing a trained detection model, one or more visual patterns from the rendered screenshot, the trained detection model outputting visual detections that include bounding boxes and visual pattern labels;

constructing a mapping between at least one bounding box of the visual detections and a corresponding DOM element represented in the structured representation of the DOM;

determining, for at least one DOM element, a semantic pattern using a DOM-based semantic classifier that reads accessibility-related metadata;

detecting a component root for a UI component corresponding to the at least one DOM element, including using a contingency-table mechanism, an interactive-probing mechanism, or both, wherein using the interactive-probing mechanism further includes:

determining whether a behavioral pattern of the UI component is certain;

responsive to determining that the behavioral pattern is not certain:

simulating targeted interactions configured to expose an actual behavioral pattern, including at least one of keyboard-based inputs, pointer-based inputs, or both; and monitoring runtime evidence including at least one of DOM mutations, attribute transitions, triggered events, or focus shifts to match a behavioral signature to an established pattern definition; and executing, by a component testing system, an accessibility test suite corresponding to an identified pattern for the UI component, and recording one or more accessibility issues associated with the UI component.

2. The method of claim 1, wherein the structured representation of the DOM is enriched with augmented attributes including at least one of computed accessibility metadata, element bounding rectangles, accessibility roles, event listeners, accessible names, or visibility state, and wherein the rendered screenshot and the enriched structured representation form a multimodal input set used to compute the visual patterns and determine the semantic pattern.

3. The method of claim 1, wherein constructing the mapping further comprises:

associating a bounding box with a DOM node by evaluating geometric overlap between the bounding box and a DOM-reported bounding rectangle of the DOM node.

4. The method of claim 3, wherein constructing the mapping further comprises:

responsive to multiple DOM elements overlapping a same bounding box or wrapper structures being present, applying a component-matching algorithm that utilizes one or more geometric or historical association metrics to select a matched DOM node; and assigning a unique selector to the matched DOM node.

5. The method of claim 1, wherein using the contingency-table mechanism further comprises:

detecting a conflict between a visual pattern and a semantic pattern using the contingency-table mechanism; and executing a machine-implemented resolution logic associated with the contingency-table mechanism that evaluates the visual-pattern and the semantic-pattern of the UI element to determine an appropriate resolution action for the UI element.

6. The method of claim 1, wherein performing the interactive-probing mechanism further comprises:

applying one or more protective controls configured to reduce destructive effects during the interactive-probing mechanism.

7. The method of claim 1, further comprising:

generating an accessibility report that consolidates the accessibility issues identified for tested elements, associates the accessibility issues with selectors and component roots, and includes metadata including severity and Web Content Accessibility Guidelines (WCAG) criterion applicability.

8. The method of claim 7, wherein generating the accessibility report further comprises:

correlating elements across scans using an accessibility-fingerprinting method based on semantic hierarchies and accessible-name paths.

9. A non-transitory computer-readable medium storing a set of instructions for improved detection of accessibility issues in Web interfaces, the set of instructions comprising:

one or more instructions that, when executed by one or more processing circuitries of a device, cause the device to:

capture a rendered screenshot of a web page into a browser-controlled environment and a structured representation of a document object model (DOM);

compute, by executing a trained detection model, one or more visual patterns from the rendered screenshot, the trained detection model outputting visual detections that include bounding boxes and visual pattern labels;

construct a mapping between at least one bounding box of the visual detections and a corresponding DOM element represented in the structured representation of the DOM;

determine, for at least one DOM element, a semantic pattern using a DOM-based semantic classifier that reads accessibility-related metadata;

detect a component root for a UI component corresponding to the at least one DOM element, including using a contingency-table mechanism, an interactive-probing mechanism, or both, wherein using the interactive-probing mechanism further includes:

determining whether a behavioral pattern of the UI component is certain;

responsive to determining that the behavioral pattern is not certain:

simulating targeted interactions configured to expose an actual behavioral pattern, including at least one of keyboard-based inputs, pointer-based inputs, or both; and monitoring runtime evidence including at least one of DOM mutations, attribute transitions, triggered events, or focus shifts to match a behavioral signature to an established pattern definition; and execute, by a component testing system, an accessibility test suite corresponding to an identified pattern for the UI component, and recording one or more accessibility issues associated with the UI component.

10. A system for improved detection of accessibility issues in Web interfaces comprising:

a processing circuitry;

a memory, the memory containing instructions that, when executed by the processing circuitry, configure the system to:

capture a rendered screenshot of a web page into a browser-controlled environment and a structured representation of a document object model (DOM);

compute, by executing a trained detection model, one or more visual patterns from the rendered screenshot, the trained detection model outputting visual detections that include bounding boxes and visual pattern labels;

construct a mapping between at least one bounding box of the visual detections and a corresponding DOM element represented in the structured representation of the DOM;

determine, for at least one DOM element, a semantic pattern using a DOM-based semantic classifier that reads accessibility-related metadata;

detect a component root for a UI component corresponding to the at least one DOM element, including using a contingency-table mechanism, an interactive-probing mechanism, or both, wherein using the interactive-probing mechanism further includes:

determining whether a behavioral pattern of the UI component is certain;

responsive to determining that the behavioral pattern is not certain:

simulating targeted interactions configured to expose an actual behavioral pattern, including at least one of keyboard-based inputs, pointer-based inputs, or both; and monitoring runtime evidence including at least one of DOM mutations, attribute transitions, triggered events, or focus shifts to match a behavioral signature to an established pattern definition; and execute, by a component testing system, an accessibility test suite corresponding to an identified pattern for the UI component, and recording one or more accessibility issues associated with the UI component.

11. The system of claim 10, wherein the structured representation of the DOM is enriched with augmented attributes including at least one of computed accessibility metadata, element bounding rectangles, accessibility roles, event listeners, accessible names, or visibility state, and the rendered screenshot and the enriched structured representation form a multimodal input set used to compute the visual patterns and determine the semantic pattern.

12. The system of claim 10, wherein the memory contains further instructions that, when executed by the processing circuitry for constructing the mapping, further configure the system to:

associate a bounding box with a DOM node by evaluating geometric overlap between the bounding box and a DOM-reported bounding rectangle of the DOM node.

13. The system of claim 12, wherein the memory contains further instructions that, when executed by the processing circuitry for constructing the mapping, further configure the system to:

responsive to multiple DOM elements overlap a same bounding box or wrapper structures being present, applying a component-matching algorithm that utilizes one or more geometric or historical association metrics to select a matched DOM node; and assign a unique selector to the matched DOM node.

14. The system of claim 10, wherein the memory contains further instructions which when executed by the processing circuitry for using the contingency-table mechanism further configure the system to:

detect a conflict between a visual pattern and a semantic pattern using a contingency-table mechanism; and execute a machine-implemented resolution logic associated with the contingency-table mechanism that evaluates the visual-pattern and the semantic-pattern of the UI element to determine an appropriate resolution action for the UI element.

15. The system of claim 10, wherein the memory contains further instructions which when executed by the processing circuitry for performing the interactive-probing mechanism further configure the system to:

apply one or more protective controls configured to reduce destructive effects during the interactive-probing mechanism.

16. The system of claim 10, wherein the memory contains further instructions which when executed by the processing circuitry further configure the system to:

generate an accessibility report that consolidates the accessibility issues identified for tested elements, associates the accessibility issues with selectors and component roots, and includes metadata including severity and Web Content Accessibility Guidelines (WCAG) criterion applicability.

17. The system of claim 16, wherein the memory contains further instructions that, when executed by the processing circuitry for generating the accessibility report, further configure the system to:

correlate elements across scans using an accessibility-fingerprinting method based on semantic hierarchies and accessible-name paths.

* * * * *